(12) United States Patent
Bamji

(10) Patent No.: US 7,405,812 B1
(45) Date of Patent: Jul. 29, 2008

(54) METHOD AND SYSTEM TO AVOID INTER-SYSTEM INTERFERENCE FOR PHASE-BASED TIME-OF-FLIGHT SYSTEMS

(75) Inventor: Cyrus Bamji, Fremont, CA (US)

(73) Assignee: Canesta, Inc., Sunnyvale, CA (US)

( * ) Notice: Subject to any disclaimer, the term of this patent is extended or adjusted under 35 U.S.C. 154(b) by 0 days.

(21) Appl. No.: 11/803,660

(22) Filed: May 14, 2007

Related U.S. Application Data

(60) Provisional application No. 60/801,201, filed on May 18, 2006.

(51) Int. Cl.
*G01C 3/08* (2006.01)
(52) U.S. Cl. .......................................... 356/5.1
(58) Field of Classification Search ............... 245/5.1
See application file for complete search history.

(56) References Cited

U.S. PATENT DOCUMENTS

| | | | | |
|---|---|---|---|---|
| 4,895,441 A | * | 1/1990 | Allen, Jr. ................ | 356/5.09 |
| 2002/0071109 A1 | * | 6/2002 | Allen et al. ............. | 356/5.01 |
| 2006/0067451 A1 | * | 3/2006 | Pollman et al. ......... | 375/367 |

* cited by examiner

*Primary Examiner*—Thomas H. Tarcza
*Assistant Examiner*—Luke D Ratcliffe
(74) *Attorney, Agent, or Firm*—Canesta, Inc.; Michael A. Kaufman

(57) ABSTRACT

Inter-system interference cross-produce $P_{12}$ is reduced in a phase-based TOF system by randomizing instantaneous phase and/or frequency within a capture interval (or detection integration period). In one aspect, the TOF clock system frequency preserves long-term clock frequency stability but intentionally includes random or pseudo-random clock noise. The noise ensures the generated clock signals are temporally imperfect and lack substantial perfect periodicity. A second aspect causes the TOF clock system to hop frequency, preferably pseudo-randomly. TOF system homodyning favors detection of optical energy whose frequency correlates to the time-varying frequency of the emitted optical energy. Thus, the varying spectral spacing of the emitted optical energy reduces likelihood that an adjacent TOF system at any given time will emit optical energy of an interfering frequency. At least one aspect is employed, both aspects being mutually complementary to reduce the cross-correlation product $P_{12}$ without substantially affecting TOF system performance.

20 Claims, 8 Drawing Sheets

METHOD AND SYSTEM TO AVOID INTER-SYSTEM INTERFERENCE FOR PHASE-BASED TIME-OF-FLIGHT SYSTEMS

RELATIONSHIP TO CO-PENDING APPLICATION

Priority is claimed from U.S. provisional patent application Ser. No. 60/801,201, filed on 18 May 2006, entitled Method and System to Avoid Inter-System Interference for Phase-Based Time-of-Flight Systems, assigned to Canesta, Inc. of Sunnyvale, Calif., assignee herein.

FIELD OF THE INVENTION

The invention relates generally to phase-based time-of-flight detection systems that examine detected signal phase-shift to determine Z distances, and more particularly to avoiding inter-system interference when several such systems are operating in relatively close proximity.

BACKGROUND OF THE INVENTION

Time-of-flight (TOF) systems that provide a measure of distance (Z) from the system to a target object without depending upon luminosity or brightness information obtained from the target object are known in the art. See for example U.S. Pat. No. 6,323,942 entitled CMOS-Compatible Three-Dimensional Image Sensor IC (2001), assigned to Canesta, Inc., now of Sunnyvale, Calif. TOF systems according to the '942 patent emit optical energy and determine how long it takes until at least some of that energy reflected by a target object arrives back at the system to be detected. Emitted optical energy traversing to more distant surface regions of a target object before being reflected back toward the system will define a greater TOF than if the target object were closer to the system. If the roundtrip TOF time is denoted t1, then the distance between target object and the TOF system is Z1, where $Z1=t1 \cdot C/2$, where C is velocity of light. Such systems can acquire both luminosity date (signal amplitude) and TOF distance, and can realize three-dimensional images of a target object in real time.

A more sophisticated TOF system is exemplified by U.S. Pat. Nos. 6,515,740 (2003) and 6,580,496 (2003) respectively Methods and Systems for CMOS-Compatible Three-Dimensional Imaging Sensing Using Quantum Efficiency Modulation, assigned to Canesta, Inc., now of Sunnyvale, Calif. FIG. 1A depicts an exemplary phase-shift detection system 100 according to the '740 or the '296 patents, a system in which TOF is determined by examining relative phase shift between transmitted light signals and light signals reflected from the target object. Detection of the reflected light signals over multiple locations in the system pixel array results in measurement signals that are referred to as depth images. The depth images represent a three-dimensional image of the target object surface.

Referring to FIG. 1A, TOF system 100 includes a two-dimensional array 130 of pixel detectors 140, each of which has dedicated circuitry 150 for processing detection charge output by the associated detector. In a typical application, array 130 might include 100×100 pixels 230, and thus include 100×100 processing circuits 150. IC 110 may also include a microprocessor or microcontroller unit 160, memory 170 (which preferably includes random access memory or RAM and read-only memory or ROM), a high speed distributable clock 180, and various computing and input/output (I/O) circuitry 190. Among other functions, controller unit 160 may perform distance to object and object velocity calculations.

Under control of microprocessor 160, a source of optical energy 120 is periodically energized via exciter 115, and emits optical energy via lens 125 toward an object target 20. Typically the optical energy is light, for example emitted by a laser diode or LED device 120. Some of the emitted optical energy will be reflected off the surface of target object 20, and will pass through an aperture field stop and lens, collectively 135, and will fall upon two-dimensional array 130 of pixel detectors 140 where an image is formed. In some implementations, each imaging pixel detector 140 captures time-of-flight (TOF) required for optical energy transmitted by emitter 120 to reach target object 20 and be reflected back for detection by two-dimensional sensor array 130. Using this TOF information, distances Z can be determined. Advantageously system 100 can be implemented on a single IC 110, without moving parts and with relatively few off-chip components.

Typically optical energy source 20 emits preferably low power (e.g., perhaps 500 mW peak) periodic waveforms, producing optical energy emissions of known frequency (perhaps 30 MHz to a many hundred MHz) for a time period known as the shutter time (perhaps 10 ms). Optical energy from emitter 120 and detected optical energy signals within pixel detectors 140 are synchronous to each other such that phase difference and thus distance Z can be measured for each pixel detector. The detection method used is referred to as homodyne detection in the '740 and '496 patents. Phase-based homodyne detection TOF systems are also described in U.S. Pat. No. 6,906,793, Methods and Devices for Charge Management for Three-Dimensional Sensing, assigned to Canesta, Inc., assignee herein.

The optical energy detected by the two-dimensional imaging sensor array 130 will include light source amplitude or intensity information, denoted as "A", as well as phase shift information, denoted as 4. As depicted in exemplary waveforms in FIGS. 1B and 1C, the received phase shift information (FIG. 1C) varies with TOF and can be processed to yield Z data. For each pulse train of optical energy transmitted by emitter 120, a three-dimensional image of the visible portion of target object 20 is acquired, from which intensity and Z data is obtained (DATA). As described in U.S. Pat. Nos. 6,515,740 and 6,580,496 obtaining depth information Z requires acquiring at least two samples of the target object (or scene) 20 with 90° phase shift between emitted optical energy and the pixel detected signals. While two samples is a minimum figure, preferably four samples, 90° apart in phase, are acquired to permit detection error reduction due to mismatches in pixel detector performance, mismatches in associated electronic implementations, and other errors. On a per pixel detector basis, the measured four sample data are combined to produce actual Z depth information data. Further details as to implementation of various embodiments of phase shift systems may be found in U.S. Pat. Nos. 6,515,740 and 6,580,496.

FIG. 1C is taken from U.S. Pat. No. 6,580,496 and depicts exemplary fixed phase delay (VPD) homodyne quantum efficiency (QE) detection. As described herein, such detection involves homodyning (or mixing) detected signal $S_2$ (generated from emitter 120) received at a pixel 140, with a reference signal derived from the clock circuit 180 controlling generator 115 and light source 120. Without loss of generality and for ease of explanation, it will be assumed that all clocks $\hat{c}$ and signals $\hat{s}$ are zero mean $\hat{c}=0$ and $\hat{s}=0$, e.g., an average duty cycle of 50%.

In a phase based TOF system 100, the Z distance of a target object is proportional to the phase delay of the modulated signal $\hat{s}_p(t)$ (or $S_2$ in FIG. 1A) received at a pixel 140 in pixel array 130. Thus by computing the phase delay, the distance Z between the TOF system and a surface point on target object 20 can be readily computed. Phase is computed by integrating the cross product of the pixel signal $\hat{s}_p(t)$ with a reference clock c(t) that is synchronized with the clock system 180 (see FIG. 1A) that commands optical energy source 120. As noted above, phase is computed from multiple, preferably four, samples 90° apart. Each such sample may be considered to be pixel output R, where the pixel integrates the modulated light over a period T:

$$R = \int_0^T c_1(t) \cdot s_p(t) \cdot dt.$$

As will be described later with respect to FIGS. 2A and 2B, if two systems 100, e.g., system 100-A, 100-B are operating in relatively close proximity, the pixel in system 100-A may also integrate a signal $\hat{s}_p(t)$ from optical energy emitted by system 100-B, and vice versa. With respect to the pixel in system 100-A, total pixel response will now be $$R_{total} = \int_0^T c_1(t) \cdot (s_p(t) + s_b(t)) \cdot dt.$$

To reduce impact of the signal generated by system 100-B upon system 100-A, one must minimize $$R_{error} = \int_0^T c_1(t) \cdot s_b(t) \cdot dt.$$

Since $\hat{s}_b(t)$ is synchronized with clock $c_2$ (e.g., clock 180) of system 100-B, inter-system interference is (statistically) proportional to $$\int_0^T c_1(t) \cdot c_2(t) \cdot dt$$

where is the integration interval. The above integration may be said to define a cross-correlation product $P_{12}$, whose magnitude the present invention seeks to minimize. A self-correlation product $P_{11}$ may be defined as $$\int_0^T c_1(t) \cdot c_1(t) \cdot dt.$$

It is understood that $P_{11}$, $P_{12}$ are time-varying samples that represent statistical characteristics of the clock signal.

FIG. 1D is useful in better understanding homodyne detection in a phase-based TOF system. FIG. 1D depicts a portion of array 130 on IC 110 (see FIG. 1A), where 140-1, 140-N denote two differential pixel detectors, and 150-1, 150-N denote respective associated pixel electronics. FIG. 1D is similar to what is described with respect to the fixed phase delay embodiment of FIG. 10 in U.S. Pat. No. 6,580,496, entitled Systems for CMOS-Compatible Three-Dimensional Image Sensing Using Quantum Efficiency Modulation, or in U.S. Pat. No. 7,906,793, entitled Methods and Devices for Charge Management for Three-Dimensional Sensing, both patents assigned to Canesta, Inc., assignee herein. In FIG. 1D, detection-generated photocurrent from each QE-modulated differential pixel detector, e.g., 140-1, is differentially detected (DIF. DETECT) and differentially amplified (AMP) to yield signals B·cos(φ), B·sin(φ), where B is a brightness coefficient, A fixed 0° or 90° phase shift delay (DELAY) is switchably insertable responsive to a phase select control signal (PHASE SELECT). The configuration also includes a 180° inverting stage. Homodyne mixing occurs using QE modulation to derive phase difference between transmitted and received signals (see FIGS. 1B, 1C), and to derive TOF, among other data. A more detailed description of homodyne detection in phase-based TOF systems is found in the '496 patent. Although sinusoidal type periodic waveforms are indicated in FIG. 1D, non-sinusoidal waveforms may instead be used.

As noted, if two or more TOF systems 100, e.g., 100-A, 100-B, are operated in relatively close proximity, system 100-A may detect optical energy emitted by system 100-B (in addition to detecting optical energy emitted by system 100-A) and vice versa. Such scenarios are exemplified by FIGS. 2A and 2B, where phase-based TOF systems are deployed in motor vehicles, and where inter-system interference can corrupt the desired DATA. In FIG. 2A, motor vehicle 200-A is provided with a phase-based TOF system 100-A, and motor vehicle 200-B is provided with a similar phase-based TOF system 100-B. In FIG. 2A, radiation $S_1$-A is emitted by system 100-A, and radiation $S_1$-B is emitted by system 100-B.

In an actual system, there would be several emitters (such as emitters 120 in FIG. 1A) disposed at various locations on each vehicle so as to emit optical energy to the right, to the left, forward, and to the rear. (Similarly there would be a number of detector arrays, such as 130 in FIG. 1A, disposed to detect target-object reflected emitted radiation.) If radiation $S_1$-A emitted from system 100-A reflects off a target object, e.g., vehicle 100-B, system 100 can determine the distance Z between the two vehicles. DATA from system 100 can be used to signal a warning to the operator of vehicle 100-A, and/or command the steering system of system 100-A to take safe evasive action, and/or to intelligently deploy air bag(s) within vehicle 100-A is dynamic Z values indicated a collision is unavoidably imminent. However if the target object is another vehicle, vehicle 100-B, equipped with a similar system, 100-B, optical energy detected by system 100-A may include reflected $S_1$-B optical energy in addition to reflected $S_1$-A optical energy. The resultant inter-system interference or interaction can result in erroneous or corrupt DATA from each system. In an application such as shown in FIG. 2A, motor vehicle collisions could result from reliance upon corrupted DATA.

FIG. 2B depicts another example of vehicular inter-system interference. In this example, two vehicles 200-A, 200-B are each backing up towards a wall 210. Normally system 100-A in vehicle 200-A would detect emitted radiation reflected by the surface of a target object, here wall 210. Valid DATA from system 100-A could alert the operator of vehicle 200-A if distance Z to the wall is suddenly too low, e.g., vehicle 100-A is inadvertently about to hit the wall. But if vehicle 100-B has a similar system 100-B, interference between the two systems can result in each system determining erroneous data, e.g., corrupt DATA. The result might be that each vehicle would be allowed to collide with wall 210.

While FIGS. 2A and 2B depict prior art phase-based TOF system 100 used in motor vehicle applications, such system also found use in other applications. For example, it is known in the art to employ TOF systems to determine distance Z between a system that may be phase-based such as system 100, and locations on a virtual input device. The virtual input device can be a virtual keyboard where locations thereon represent virtual keys "contacted" by a user's finger or stylus. See for example U.S. Pat. No. 6,614,422 Method and Apparatus for Entering Data Using a Virtual Input Device, assigned to Canesta, Inc., assignee herein. It will be appreciated that if more than one virtual input system were used in close physical proximity to another such system, active light emitted by one system could interfere with detection of reflected light emitter by the other system, and vice versa. In a virtual keyboard application, the result would be misinterpreted keystrokes, e.g., many typographical errors.

As the popularity of phase-based TOF systems increases, the likelihood of inter-system interference from adjacent systems will increase. In a virtual keyboard application, inter-system errors would merely result in mistyped characters. But in vehicle safety applications, or in so-called industrial light curtain safety applications, inter-system errors could result in substantial damage to lives and property.

In TOF systems, pixel output R is usually determined to a precision better than 1%. Thus it is desirable to maintain magnitude of $R_{error}$ such that the absolute magnitude of the interference quotient $R_{error}/R_{total} < 1\%$. But in an application such as shown in FIG. 2B, if system 100-B is three times closer to wall 210 than is system 100-A, and if both system output equal optical power, the signal from system 100-B will be about ten times brighter than that from system 100-A. If under these conditions it is desired that $R_{error}/R_{total} < 1\%$ (absolute magnitude), then assuming equal optical power, the result suggests that approximately the absolute magnitude of $P_{12}/P_{11} < 10^{-3}$. Stated different, the $R_{error}/R_{total}$ quotient represents the ratio between two brightness amplitudes that may vary widely in magnitude, especially if one system illuminates a target object with say ten times more intensity, e.g., perhaps because the target object is closer. In implementing phase-based TOF systems 100, convention wisdom has dictated that clock system 180 should be a high quality clock, characterized by stable frequency and low noise characteristics.

Oscillator noise including modeling of naturally occurring noise in oscillators has been extensively studied, and numerous references are widely available, including treatises and other research authored by Behzad Razavi. By carefully shaping and controlling naturally occurring oscillator noise, e.g., thermal noise 1/KtC, shot noise, 1/f noise, the correlation product $P_{12}$ can be minimized without substantially changing system accuracy. It is known in the art to reduce the impact of such oscillator noise sources in applications by careful oscillator design and use of techniques including phase-lock loops (PLL), delay lock loops (DLL), etc. Exemplary specifications for such prior art clock systems might be clock frequency stability on the order of 10 to 30 ppm at a nominal clock frequency of about 0.5 GHz to perhaps about 1 GHz, and clock phase stability on the order of $1/1000$, or in terms of a Fourier analysis, a 100 dbc at a 100 KHz deviation.

Attempts have been made in the prior art to address the inter-system interference problem noted above with respect to phase-based TOF systems. For example EP1647839A2 assigned to PMD, and entitled Enffernungsnmess-vorrichtung zum Bestimmen der Enffernung Zwischen Einem Objekt & der Vorrich-tung, translated as Method and Distance Measuring Device for Determining the Distance Between an Object and the Device seeks to change the clock operating frequency at each frame of phase capture, e.g., between integration periods, but apparently changes nothing within integration periods. But implementing this approach has many problems. For example, in many phase-based TOF systems, multiple phase captures are combined to produce a frame, and multiple frames may share multiple. If each phase capture were of a different clock frequency, meaningfully combining their respective data to produce a frame of depth data is mathematically very complex. Additionally, a TOF system is usually calibrated to operate at one particular average frequency $f_{average}$. Different operating frequencies can result in multiple calibration tables, one for each frequency. Further, it will always be possible that the frequencies of two TOF systems may be the same during a capture, in which case the systems are susceptible to the inter-system errors noted herein. Stated differently, attempting to randomize inter-system interference by changing the frequency between integration periods is somewhat impractical and ineffective.

What is needed then is a method and system to minimize the likelihood of such intra-system interference in a phase-based TOF system. Preferably such method and system should avoid using clocking systems that are difficult or expensive to implement, or that cannot be implemented using CMOS-compatible techniques.

The present invention provides a method and system to reduce the likelihood of intra-system interference from adjacent phase-based TOF systems.

SUMMARY OF THE PRESENT INVENTION

Likelihood of inter-system interference between adjacent phase-based TOF systems is lessened by reducing the cross-correlation product $P_{12}$ using at least one of two complementary aspects. Using either or both aspects, the present invention can randomize interference within a capture interval (e.g., detection period T), and can do so while maintaining a constant average frequency between, or across, detection integration periods T.

One aspect of the present invention provides a clock that presents random or at least pseudo-random clock noise. The resultant temporally imperfect clock signals are not substantially perfectly periodic and will have a reduced cross-product $P_{12}$. Nonetheless, long-term clock frequency stability is preserved and overall system accuracy is not substantially affected.

In a second aspect, the present invention introduces preferably pseudo-random frequency hopping of the clock frequency used by a phase-based TOF system. As such, the TOF system emits optical energy having a controllably varied output frequency, rather than a single fixed frequency. Homodyning favors detection of optical energy whose frequency correlates to the time-varying frequency of the emitted optical energy. The resultant varying spectral spacing of the emitted optical energy reduces likelihood that an adjacent TOF system will at any given time emit optical energy of the exact same frequency, and thus the cross-correlation product $P_{12}$ is reduced.

Phase-based TOF systems according to the present invention can operate in relative close proximity to other phase-based TOF systems that need not include aspects of the present invention. DATA including Z distances provided by TOF systems according to the present invention are substantially unaffected by inter-system interference from optical radiation emitted by adjacent systems.

Other features and advantages of the invention will appear from the following description in which the preferred embodiments have been set forth in detail, in conjunction with their accompanying drawings.

DETAILED DESCRIPTION OF THE PREFERRED EMBODIMENT

Figure 1A:
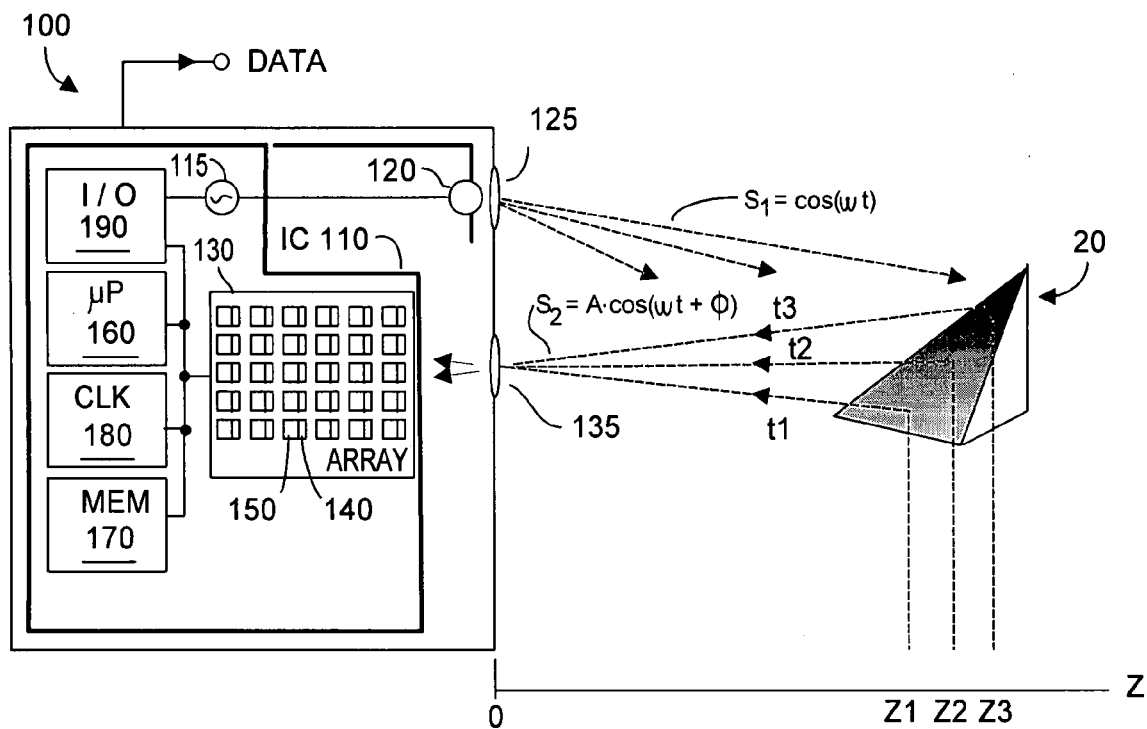
FIG. 1A is a block diagram depicting a phase-phased, three-dimensional time-of-flight imaging system as exemplified by U.S. Pat. No. 6,515,740, U.S. Pat. No. 6,580,496, and U.S. Pat. No. 6,906,793, according to the prior art.
Figure 1B:
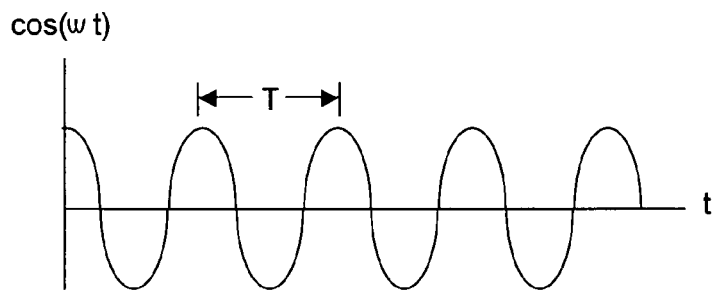
FIGS. 1B and 1C depict exemplary waveform relationships for the block diagram of FIG. 1A, according to the prior art.
Figure 1C:
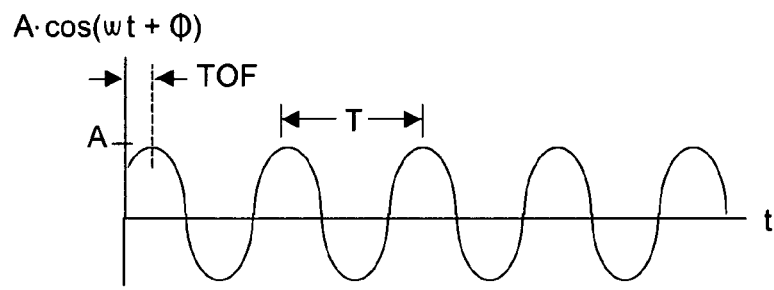
Figure 1D:
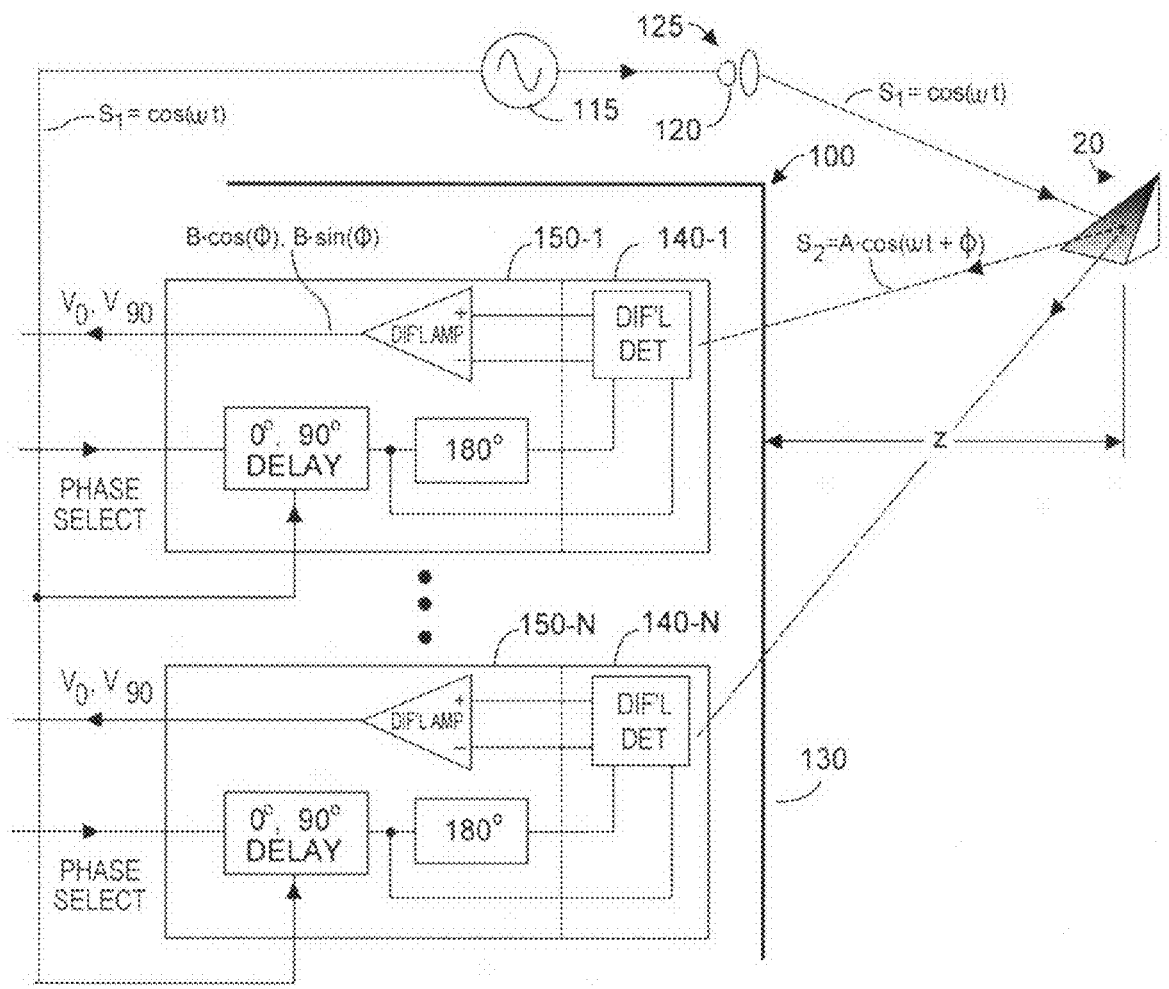
FIG. 1D is a block diagram depicting differential photodetectors and their associated electronics in a fixed-phase delay (FPD) QE modulated detector, according to the prior art.
Figure 3:
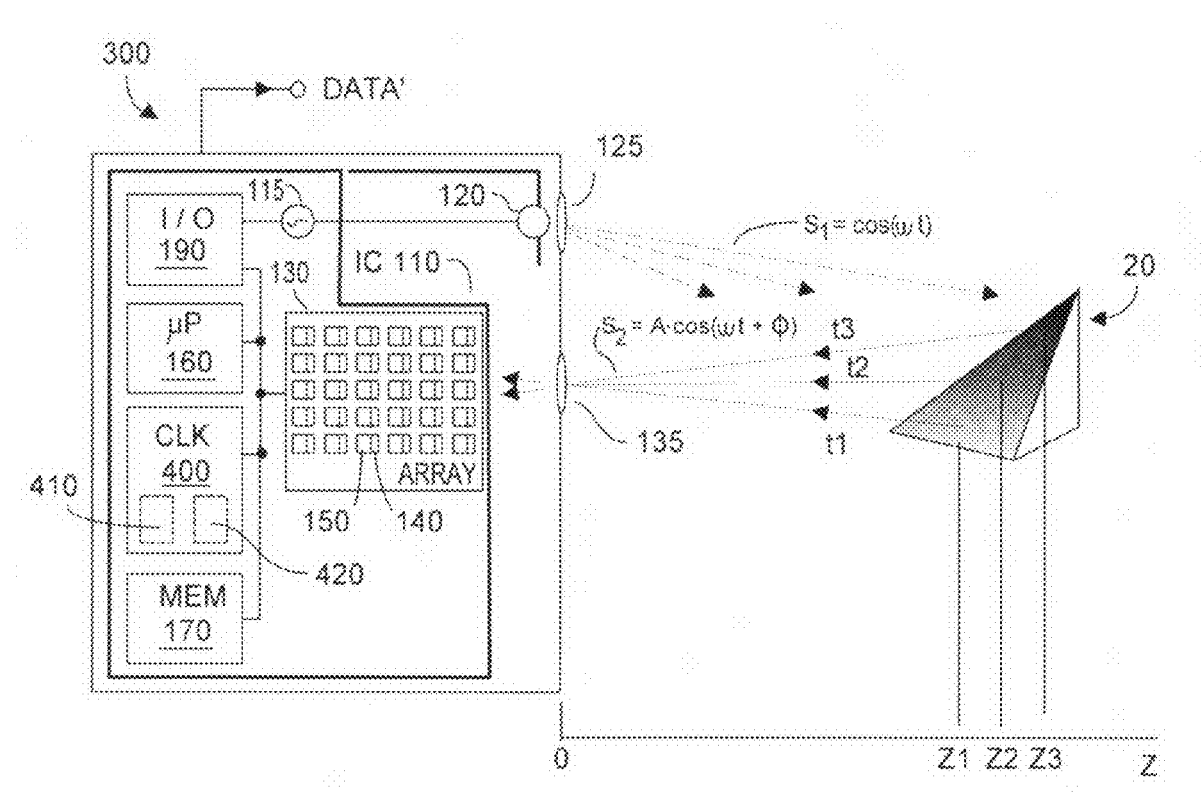
FIG. 3 is a block diagram depicting a phase-based TOF imaging system that includes a clock generator system, according to the present invention.

As noted, typically in prior art phase-based TOF systems, a high quality clock generator 180 (FIG. 1A) is employed. Understandably, implementing highly stable, low noise oscillators or clocks can be expensive. As will now be described, the present invention takes an approach quite opposite to the prior art in that noise in the high frequency clock signal is affirmatively nurtured. Referring now to FIG. 3, a phase-based TOF system 300 is shown in which prior art clock generator 180 is replaced with a clock generator system 400, according to the present invention.

Clock generator system 400 implements at least one and preferably two mutually complementary aspects to reduce the cross-correlation product $P_{12}$. Advantageously, the present invention can randomize potential interference within a pixel detection integration period T, although randomization could also be employed across period T as well. Such randomization of interference within or across a detection interval can occur while maintaining a substantially constant long-term clock frequency.

One aspect of the present invention, denoted as 410, causes overall clock generator system 400 to include random or at least pseudo-random clock noise. The resultant temporally imperfect clock signals are not substantially perfectly periodic and will have a reduced cross-product $P_{12}$. Nonetheless, long-term clock frequency stability for clock generator system 400 is preserved and overall system accuracy is not substantially affected.

A second aspect of the present invention, denoted as 420, causes overall clock generator 400 to hop frequency in a preferably pseudo-random manner. As such, source 120 in TOF system 400 emits optical energy having a controllably varied output frequency, rather than a single fixed frequency. Homodyning within array 130 favors detection of optical energy whose frequency correlates to the time-varying frequency of the emitted optical energy $S_1$. The resultant varying spectral spacing of the emitted optical energy reduces likelihood that an adjacent TOF system will at any given time emit optical energy of the same frequency as system 400, thus reducing the cross-correlation product $P_{12}$.

Figure 4:
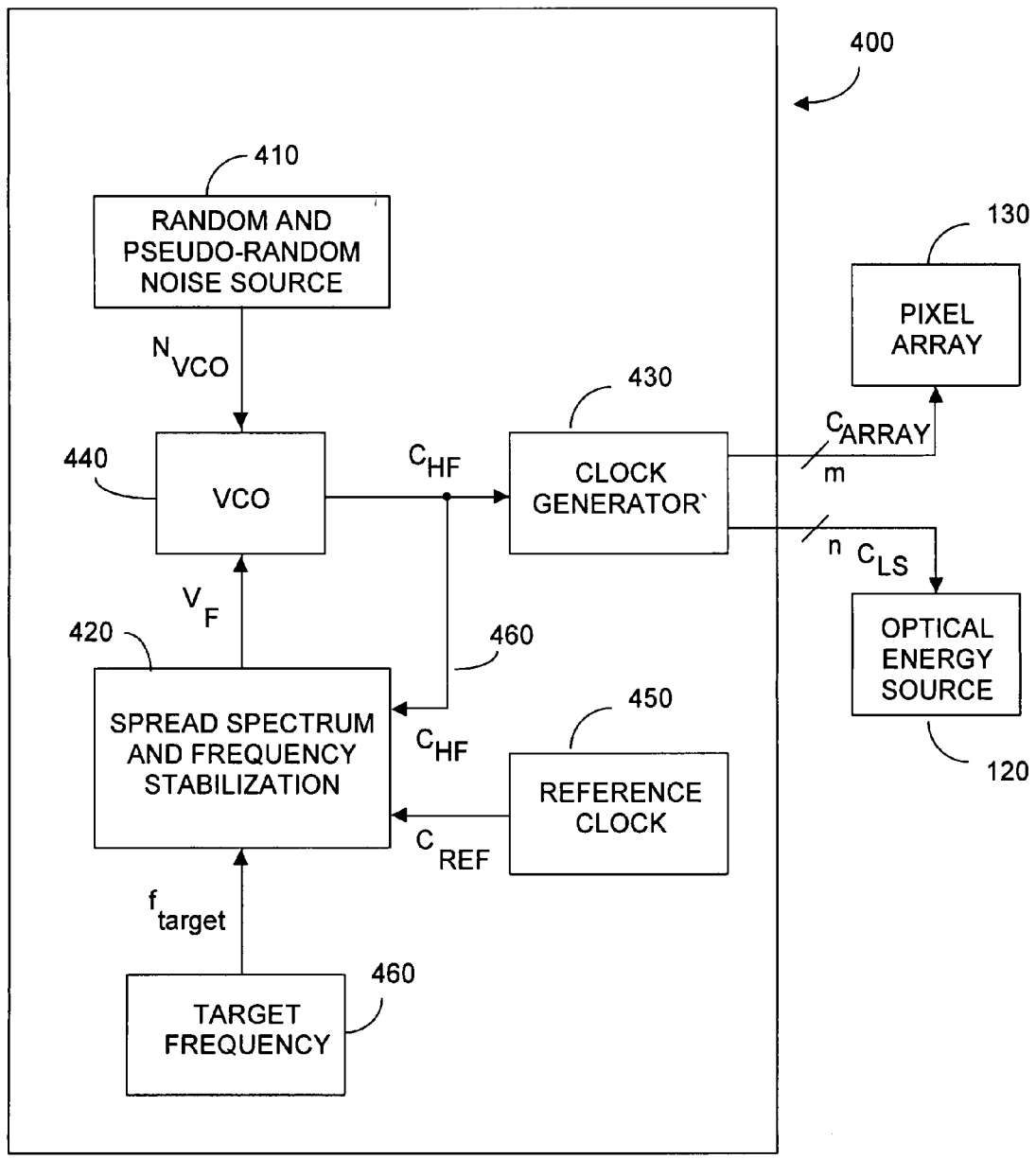
FIG. 4 depicts a clock generator system useable with a TOF system, according to embodiments of the present invention.

The first aspect of the present invention will now be described with reference to FIG. 4. In a preferred embodiment of the present invention, pixel sensor array 130 and optical energy source 120 are driven by synchronized clock signals that are output from clock generator 430. More specifically, clock generator 430 synchronously outputs signal $C_{Array}$ to drive pixel array 130, and outputs signal $C_{LS}$ to drive optical energy source 120 via exciter 115. As indicated in FIG. 4, synchronized signals $C_{Array}$ and $C_{LS}$ may have one or several individual, respectively m and n, associated signals. Signal sets $C_{Array}$ and $C_{LS}$ are synchronized and will have a fixed phase (with preferably low relative phase noise) relationship between them, as they are derived, preferably digitally, from a common preferably high frequency master clock signal $C_{HF}$ by a low noise process.

However the $C_{HF}$ signal preferably is derived from a free running VCO 440 whose oscillations are intentionally perturbed from perfect periodic oscillation preferably by introducing pseudo random noise or random noise from noise source 410. This approach is inapposite to the prior art where oscillator design attempts to reduce rather than encourage noise perturbation.

More specifically, VCO 440 outputs a reference signal $C_{HF}$ that is input to clock generator 430. But the VCO output is also affected by random and pseudo random noise output from noise source 410. Such noise may be generated by VCO 440 itself, or if further noise perturbation is required, the noise may be generated externally and injected into VCO 4440. Exemplary sources of internal VCO noise can include thermal noise, Shot noise, and flicker noise, where the VFO design can intentionally exacerbate such noise effect. Alternately, an external noise generator 410 may be employed, whose output noise is injected into VCO 440, for example, to perturbate the VCP frequency control voltage.

As noted above, clock generator 430 provides synchronized $C_{Array}$ and $C_{LS}$ signals from the $C_{HF}$ master clock signal. In one embodiment, $C_{Array}$ and $C_{LS}$ signals are preferably digitally derived by subdividing reference clock $C_{HF}$ and thus introduce minimal jitter and phase noise. Thus, phase noise between $C_{Array}$ and $C_{LS}$ is small. While relatively little jitter and phase noise is introduced by the derivation process, intrinsically signals $C_{Array}$ and $C_{LS}$ may permissibly contain substantial phase noise and jitter in that, as noted, $C_{HF}$ already contains phase noise and jitter. Using $C_{HF}$ noise alone can yield a cross-correlation product $P_{12}$ and can be comparable to about $3 \cdot 10^{-3}$.

Although it is desired that signals $C_{Array}$ and $C_{LS}$ not be perfectly periodic, e.g., their means should be zero to promote a small or zero cross correlation product $P_{12}$. It is also desired that these intentionally introduced temporal imperfections do not degrade long-term signal frequency stability. Preferably the nominal frequency of signal $C_{HF}$ is determined by the output from a spread spectrum and frequency stabilization unit 420. Spread spectrum and frequency stabilization unit 420 receives as inputs a reference clock signal $C_{REF}$, obtained from reference clock unit 450, and a fed-back $C_{HF}$ signal. Unit 420 compares the frequency of $C_{HF}$ to the stable reference frequency $C_{REF}$. Preferably feedback correlation loop 460 is characterized by a slow correction loop time on the order of the pixel detector integration time T, for example 10 ms. Loop 460 is made sufficiently slow so as not to completely remove desired noise effects as they pertain to enhancing system interference robustness by perturbating frequency. At the same time, loop 460 maintains a stable average clock frequency $C_{HF}$ over a time period comparable to the pixel integration time T. Feedback correlation loop 460 causes unit 420 to correct frequency of $C_{HF}$ such that the average frequency of $C_{HF}$ is close to the target frequency $f_{target}$. As used herein, "close to" means the two frequencies agree within about 1/1000, where $C_{HF}$ is typically on the order of about 0.5 GHz to perhaps 1 GHz. As noted, the intent is to reduce likelihood of inter-system interference by reducing the probability that two phase-based TOF systems happen to be operating at the same frequency at any given moment.

According to the second aspect of the present invention, to further randomize the master clock $C_{HF}$ frequency, spread spectrum and frequency stabilization unit 420 preferably can change nominal VCO 440 frequency settings $V_f$. Preferably $V_f$ is changed at a rate faster than frequency correction loop 460 such that the instantaneous frequency of $C_{HF}$ varies to a larger degree due to $V_f$ than due to changes produced by $N_{VCO}$ noise source(s) 410 alone.

Figure 5:
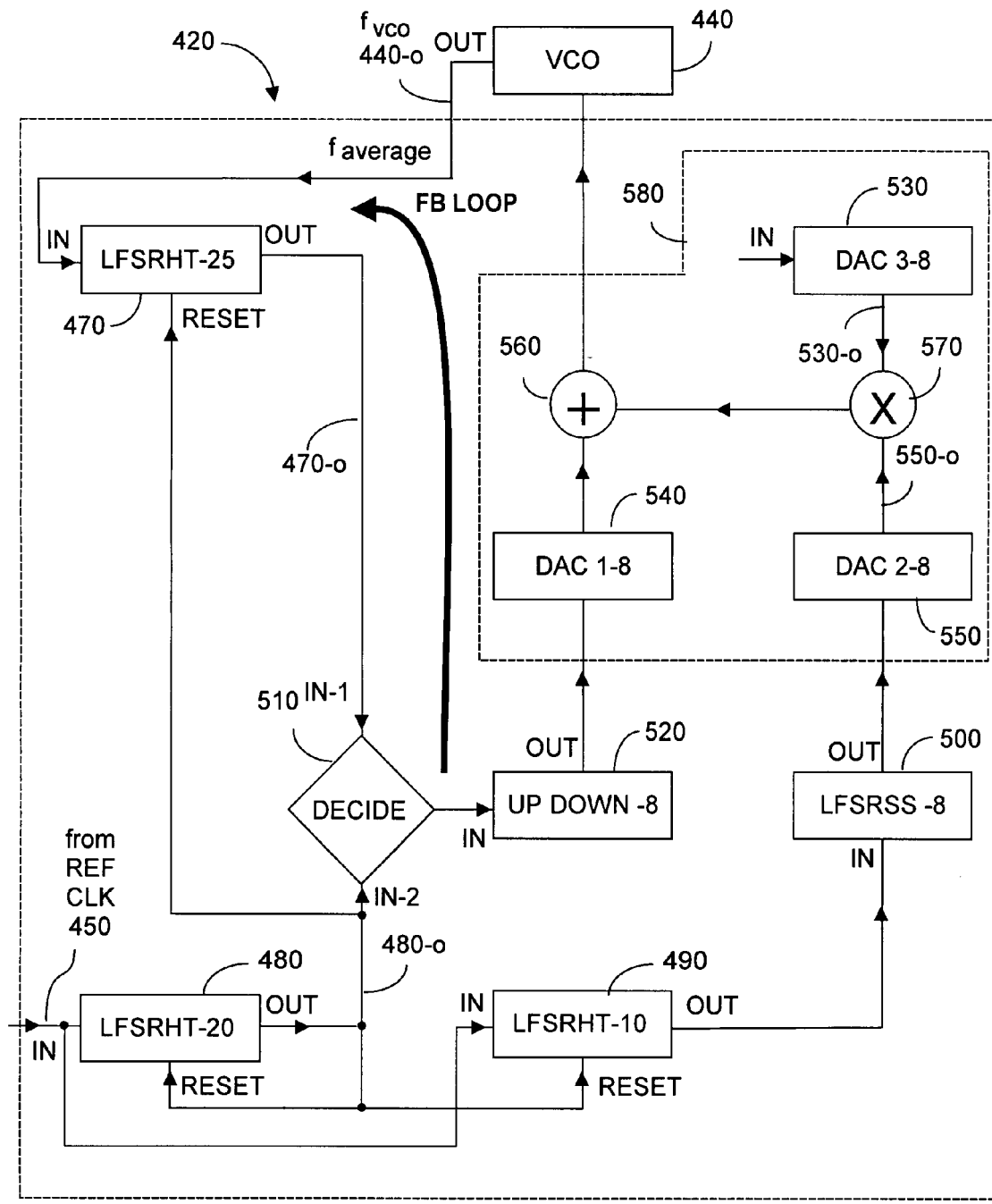
FIG. 5 depicts an exemplary implementation of a spread spectrum and frequency stabilization block as shown in FIG. 4, according to an embodiment of the present invention.

As described more fully with respect to FIG. 5, spread spectrum block 420 stabilizes the average frequency of the VCO but causes the instantaneous frequency of the VCO to hop in a preferably pseudo random fashion. Block 420 does not substantially affect, e.g., reduce, jitter or phase noise characteristics of the VCO. This feature effectively provides an additional layer of interference reduction beyond what is already provided by noise effects upon VCO 440. The overall result allows achieving cross-correlation $P_{12}/P_{11} \ll 10^{-3}$.

FIG. 5 is an exemplary implementation of the spread spectrum and frequency stabilization block 420 of FIG. 4. Block 420 enables VCO 440 to yield an output frequency $C_{HF}$ signal whose long term average frequency output, over a time on the order of detector integration time T, is set to a frequency $f_{average}$ but whose instantaneous frequency varies in a pseudo random fashion, due to block 410. As described in U.S. Pat. No. 6,906,793, phase-based TOF detectors have integration times T, during which period each pixel accumulates a signal that is built up over the integration period, typically about 10 ms. In such systems, the average frequency of $C_{HF}$ should remain stable over a comparable time period, although the instantaneous frequency can change many tens, hundreds or thousands of times within that period.

In FIG. 5, blocks 470, 480, 490 are interval counters that output a pulse after counting a programmable number of input pulses on their input. These counters preferably are resettable upon receipt of a reset pulse. These interval counters may be advantageously implemented using linear feedback shift registers (LFSRs). A typical number of bits for interval counters 470, 480, 490 may be respectively 25, 20, and 10 bits.

Block 500 is preferably a pseudo random sequence counter (PRSC) that outputs an n bit number, here 8-bits, and produces a new pseudo random number for every input clock tick. PRSC circuits, are known in the art and may also be implemented with LFSRs. See for example U.S. Pat. No. 6,323,942 assigned to Canesta, Inc. A number n=8 bits will represent $2^8=256$, i.e., generation of 256 different hopping frequencies.

Block 510 is a decision circuit that outputs a −1 if pulses at IN−1 arrive before receipt of a pulse at IN−2, and that outputs a +1 if pulses at IN−1 arrive after pulses at IN−2. Block 510 resets itself after receipt of a pulse at IN−2. Other implementations of this decision block are also possible. Block 520 is an up/down counter that counts the number of input pulses, and produces an output that represents a digital value of the frequency setting of VCO 440. Blocks 530, 540, 550 are digital to analog converters, for example 8-bit units, that convert an input digital value into an analog value. Blocks 560, 570 are respectively add and multiply functions, that may be implemented in an analog fashion. Input to DAC 530 affects the size of each frequency hop and thus affects the amount of frequency spread introduced by the spread spectrum block.

Overall operation of spread spectrum and frequency stabilization unit 420 will now be described, beginning with a description of how long term frequency stabilization of VCO 440 output To a value $f_{average}$. Interval counter 480 divides the input reference clock $C_{REF}$ having frequency $f_{ref}$ (perhaps about 50 MHz) by a value X, and outputs pulses 480-o. Similarly interval counter 470 divides the VCO output by a value Y and produces output pulses 470-o.

Values for X and Y are chosen such that that $f_{average} = f_{ref} X/Y$. If VCO 440 output frequency $f_{VCO}$ at 440-o is $f_{VCO} > f_{average}$ then $f_{VCO}/X > f_{ref}/Y$. Under these conditions, IN−1 will produce a pulse sooner than IN−2, causing decision circuit 510 to produce a −1. This −1 value is input to up/down counter 520 and will decrement the counter output, causing VCO 440 to slow down. Similarly if the VCO output frequency $f_{VCO}$ on 440-o is $f_{VCO} < f_{average}$ then $f_{VCO}/X < f_{ref}/Y$. Under these conditions, IN−1 will produce a pulse later than IN−2, and therefore the output of decision circuit 510 is a +1, which will increment the output of up/down counter 520, which causes VCO 440 to speed up. In this fashion, feedback loop (FB LOOP) including units 510, 540, 560, 440, 470 stabilizes the long term average of the frequency $f_{VCO}$ of VCO 440 to $f_{average}$. In this embodiment, the average of $f_{VCO}$ over a certain time period is used to maintain $f_{average}$. Other embodiments in which $f_{average}$ is a filtered function of $f_{VCO}$ may also be used.

A preferred method of randomizing instantaneous frequency $f_{VCO}$ of VCO 440 will now be described. Reference clock 450 provides a stable reference frequency $f_{ref}$ signal whose frequency is input to interval counter 490 and is divided by Z. Thus, interval counter 490 outputs a pulse for every Z input pulses it receives. Every output pulse from counter 490 causes PRSC 500 to change state. These state changes change are communicated to DAC 550, to multiplier 570, to adder 560, thus forcing VCO 440 to hop frequency. the frequency of Z is thus the rate at which VCO frequency hops occur.

DAC 530 controls magnitude of the VCO frequency hops by generating the multiplier 203.o for 205.o. Adder 212 adds the perturbation from the spread spectrum function 213.o to the 204.o which stabilizes the VCO frequency on average. Note that the output 480-o from counter 480 is also used as a reset pulse to reset interval counters 470, 480, 490 to ensure they are at least periodically known to start from a good state.

It will be appreciated that spread spectrum and frequency stabilization block 420 advantageously does not cancel random fluctuations of the VCO because the feedback loop (FB LOOP) is designed to be very slow. Thus, over short time intervals, VCO 440 effectively operates open loop. The desired result is that random noise-caused perturbations in frequency can occur, yet long term stability of the desired clock frequency is preserved. As a result, cross-correlation product $P_{12}$ is advantageously reduced.

Figure 6:
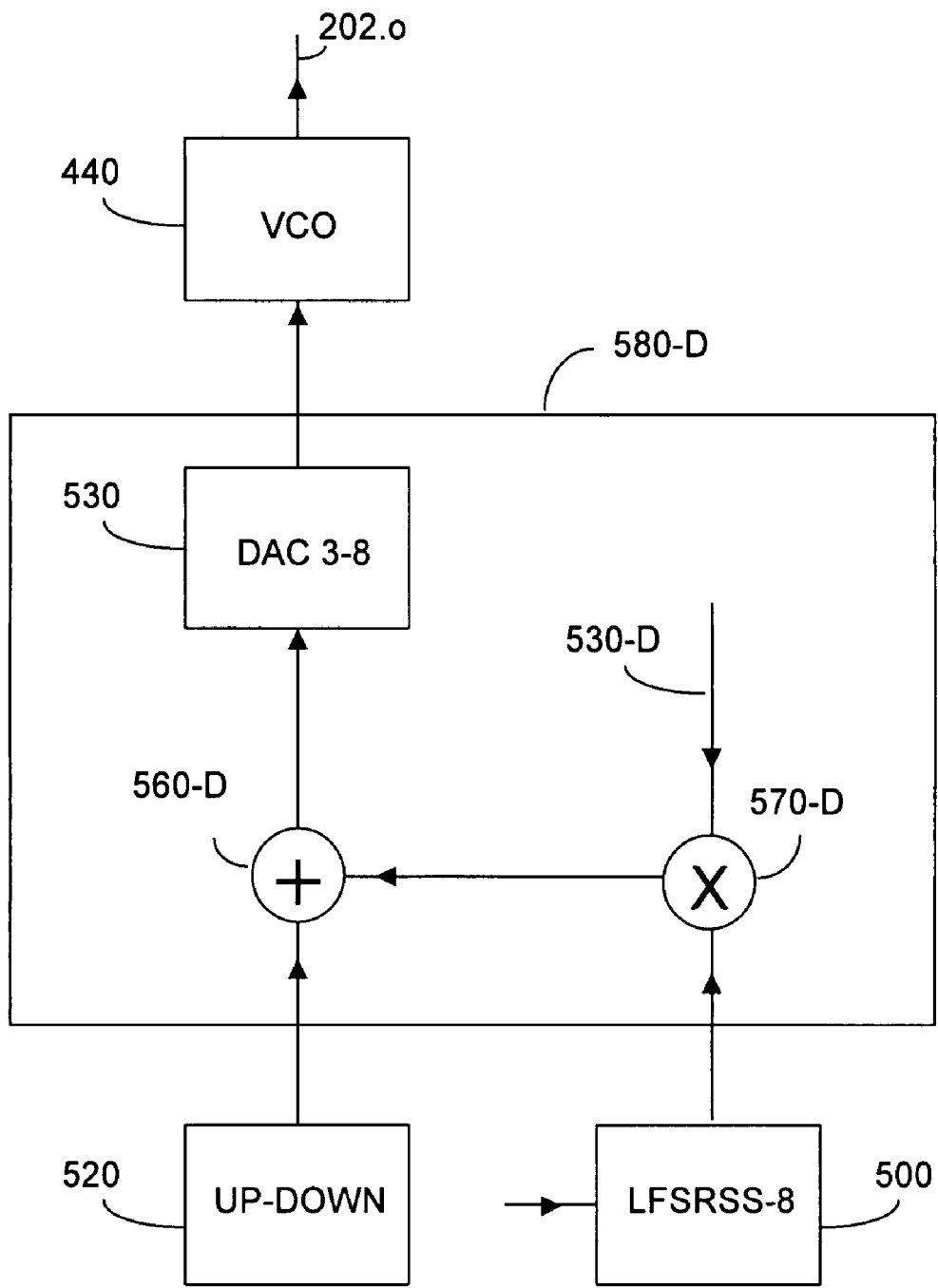
FIG. 6 depicts an exemplary digital implementation of the add-multiply analog function block shown in FIG. 5, according to an embodiment of the present invention.

If desired, add and multiply operations performed by blocks 560, 570 and associated DACs 530, 540, 550, collectively add and multiply unit 580 in FIG. 5 may be carried out in the digital domain. Digital implementation will reduce the number of analog and ADC operations. FIG. 6 depicts an exemplary such digital implementation for the add and multiply functions performed by unit 580. This is shown in FIG. 6, in which collective unit 580-D replaces unit 580 in FIG. 5. The "-D" nomenclature in FIG. 6 denotes digital implementation.

Having described FIGS. 5 and 6, a description of the various parameters used to implement that various functions in these figures will now be given.

$f_{ref}/X$ is the integration period T, over which the average value of $f_{VCO}$ is computed; this determines the value of X.

$f_{average} = f_{ref} \cdot X/Y$ is the target average frequency of VCO 244; this determines the value of Y.

Z defines the rate at which frequency hops occur.

The frequency over which frequency hops occur is given by the value in DAC 530 multiplied by the number of bits associated with counter 500.

Figure 2A:
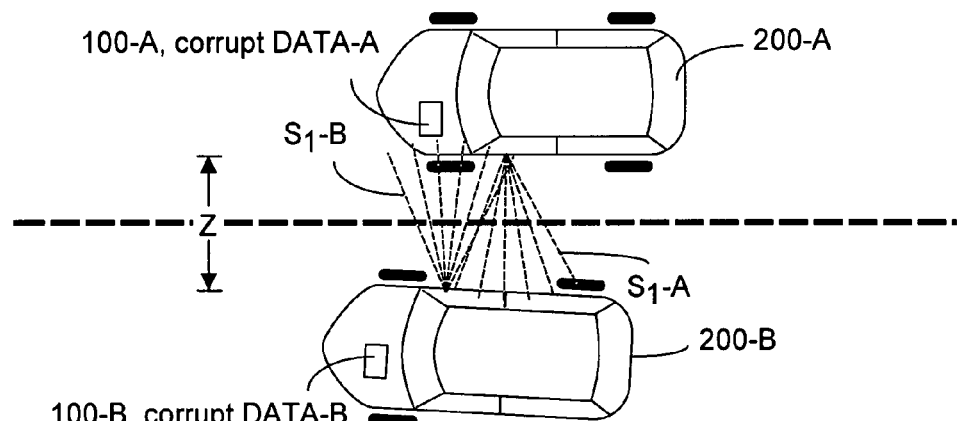
FIGS. 2A and 2B depict motor vehicles provided with potentially interfering phase-based TOF systems, according to the prior art.
Figure 2B:
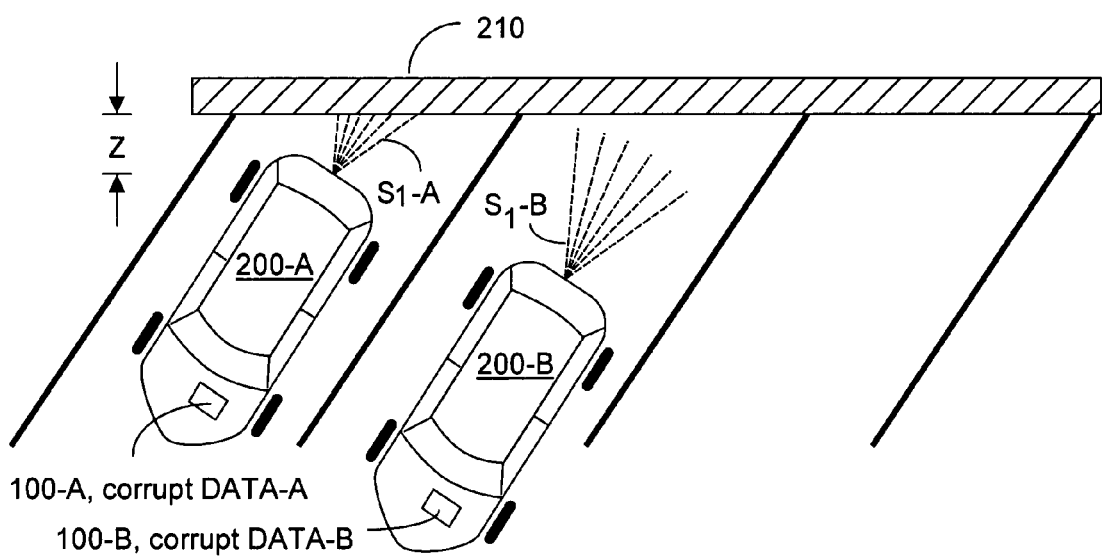
Figure 7A:
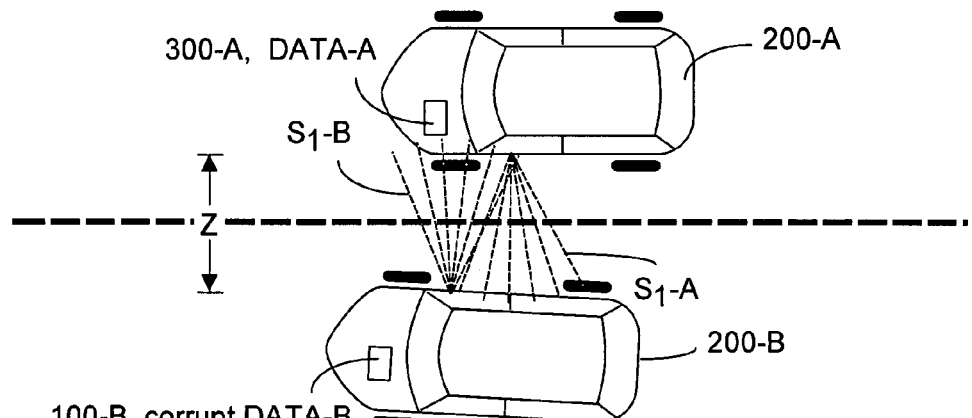
FIGS. 7A and 7B each depict a motor vehicle provided with a phase-shift TOF system with enhanced performance despite proximity to potentially interfering phase-based TOF systems, according to the present invention.
Figure 7B:
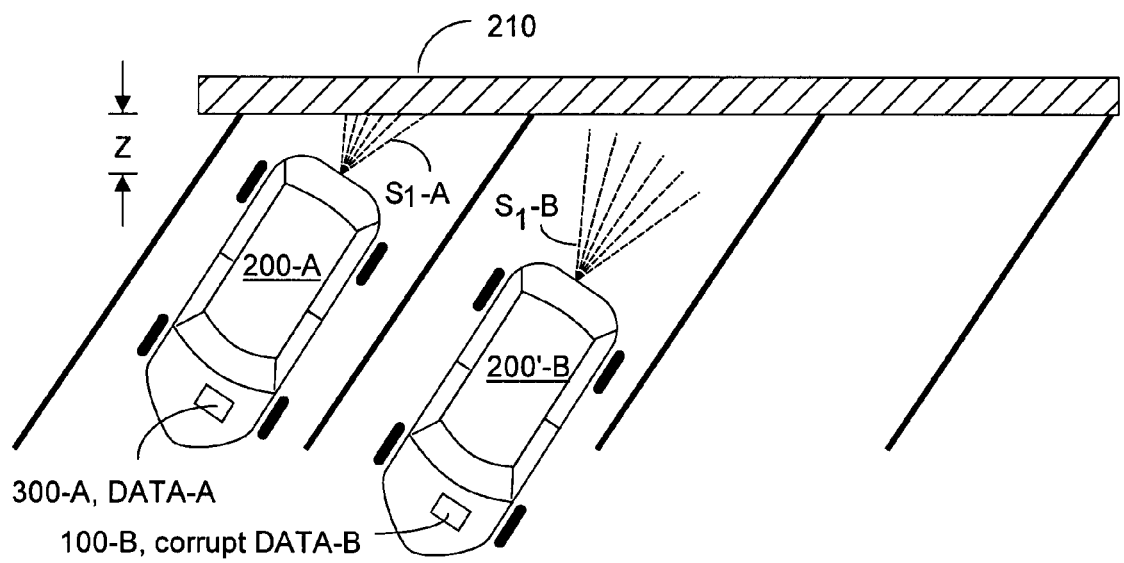

FIGS. 7A and 7B are somewhat similar to what was depicted in FIGS. 2A and 2B except that vehicle 200-A is now provided with a phase-based TOF system 300-A, according to the present invention. By contrast, vehicle 200-B is still provided with a prior art system 100-B. Because system 300-A emits and responds to optical energy transmitted at different frequencies at different times, the DATA-A generated by system 300-A is substantially less likely to be corrupted by inter-system interference from optical energy emitted by system 100-B in nearby vehicle 200-B. Prior art system 100-B in vehicle 200-B benefits too in that at any given moment, detected optical energy emitted from system 200-B is unlikely to be at the same frequency as that emitted by system 200-A. However if a third vehicle (not shown) operating a prior art system were also in the vicinity, the two prior art systems could readily interfere with each other, causing corrupted output DATA, whereas DATA-A would still be valid data. In FIG. 7A, it is understood that optical energy emitted from one system may undergo multiple reflections between reflective surfaces of the two vehicles before being detected by the emitting system.

While preferred embodiments of the present invention have been described with respect to use with homodyne detection phase-type TOF systems, it will be appreciated that aspects of the present invention may be useable with other types of TOF systems.

Modifications and variations may be made to the disclosed embodiments without departing from the subject and spirit of the invention as defined by the following claims.

What is claimed is:

1. In a first time-of-flight (TOF) detection system that emits time modulated optical energy and examines phase shift in a fraction of said optical energy reflected by a target object to determine distance Z therebetween, a method of reducing potential interference from an adjacent second TOF system also emitting optical energy, the method comprising:

generating for said first TOF system a clock signal having long term frequency stability while exhibiting at least one characteristic selected from a group consisting of (a) a signal having a temporally imperfect waveform, (b) a signal having a substantially imperfect periodicity, (c) a signal including at least pseudo-random clock noise, (d) a signal including random clock noise, (d) a signal whose frequency hops between at least two discrete frequencies, (e) a signal whose frequency hops randomly between at least two discrete frequencies, and (f) a clock whose frequencies are characterized by a spread spectrum;

wherein a cross-correlation product $P_{12}$ between detected signals from said first TOF and said second TOF system is reduced while substantially maintaining first TOF detection accuracy.

2. The method of claim 1, wherein said first TOF system employs homodyne detection.

3. The method of claim 1, wherein over a time interval approximating a detection integration time period T, said clock signal has at least one characteristic selected from a group consisting of (i) average clock signal frequency accuracy is better than about 1%, (ii) frequency of said clock signal changes at least ten times, (iii) frequency of said clock signal changes at least one hundred times, and (iv) frequency of said clock signal changes at least one thousand times.

4. The method of claim 1, wherein said cross-correlation product $P_{12}$ is less than about 1% of a self-correlation product $P_{11}$.

5. The method of claim 1, wherein at least one of characteristics (a), (b), (c), and (d) is achieved carrying out at least one procedure selected from a group consisting of (i) promoting clock noise in said clock signal, (ii) actively coupling a source of noise to said clock signal, and (iii) promoting phase noise in said clock signal.

6. The method of claim 1, wherein said first TOF system is disposed within a motor vehicle.

7. For use with a time-of-flight (TOF) homodyning detection system of the type that emits time modulated optical energy and examines phase shift in a fraction of said optical energy reflected by a target object to determine distance Z therebetween, a clock system that reduces potential interference from an adjacent second TOF system also emitting optical energy, the clock system comprising:

a clock generator outputting a clock signal having long term frequency stability while exhibiting at least one characteristic selected from a group consisting of (a) a signal having a temporally imperfect waveform, (b) a signal having a substantially imperfect periodicity, (c) a signal including at least pseudo-random clock noise, (d) a signal including random clock noise, (d) a signal whose frequency hops between at least two discrete frequencies, and (e) a signal whose frequency hops randomly between at least two discrete frequencies;

wherein a cross-correlation product $P_{12}$ between detected signals from said first TOF and said second TOF system is reduced while substantially maintaining first TOF detection accuracy.

8. The clock system of claim 7, wherein said first TOF system employs homodyne detection.

9. The clock system of claim 7, wherein over a time interval approximating a detection integration time period T, said clock signal has at least one characteristic selected from a group consisting of (i) average clock signal frequency accuracy is better than about 1%, (ii) frequency of said clock signal changes at least ten times, (iii) frequency of said clock signal changes at least one hundred times, and (iv) frequency of said clock signal changes at least one thousand times.

10. The clock system of claim 7, wherein absolute magnitude of said cross-correlation product $P_{12}$ is less than about 1% of absolute magnitude of a self-correlation product $P_{11}$.

11. The clock system of claim 7, further including at least one of (i) means for promoting clock noise in said clock signal, (ii) a source of noise coupled to said clock signal, and (iii) means for promoting phase noise in said clock signal;

wherein at least one of characteristics (a), (b), (c), and (d) is achieved.

12. The clock system of claim 7, wherein said first TOF system is disposed within a motor vehicle.

13. For use with a first time-of-flight (TOF) detection system of the type that emits modulated optical energy and examines phase shift in a fraction of said optical energy reflected by a target object to determine distance Z therebetween, a clock system that reduces potential interference from an adjacent second TOF system also emitting optical energy, the clock system comprising:

a clock generator outputting a clock signal having long term frequency stability;

means, coupled to said clock generator, for reducing a cross-correlation product $P_{12}$ between detected signals from said first TOF and said second TOF system, while substantially maintaining first TOF detection accuracy.

14. The clock system of claim 13, wherein said clock generator outputs a clock signal having long term frequency stability while exhibiting at least one characteristic selected from a group consisting of (a) a signal having a temporally imperfect waveform, (b) a signal having a substantially imperfect periodicity, (c) a signal including at least pseudo-random clock noise, (d) a signal including random clock noise, (d) a signal whose frequency hops between at least two discrete frequencies, and (e) a signal whose frequency hops randomly between at least two discrete frequencies.

15. The clock system of claim 13, wherein said first TOF system employs homodyne detection.

16. The clock system of claim 13, wherein over an time interval approximating a detection integration time period T, said clock signal has at least one characteristic selected from a group consisting of (i) average clock signal frequency accuracy is better than about 1%, (ii) frequency of said clock signal changes at least ten times, (iii) frequency of said clock signal changes at least one hundred times, and (iv) frequency of said clock signal changes at least one thousand times.

17. The clock system of claim 13, wherein absolute magnitude of said cross-correlation product $P_{12}$ is less than about 1% of absolute magnitude of a self-correlation product $P_{11}$.

18. The clock system of claim 14, further including at least one of (i) means for promoting clock noise in said clock signal, (ii) a source of noise coupled to said clock signal, and (iii) means for promoting phase noise in said clock signal;

wherein at least one of characteristics (a), (b), (c), and (d) is achieved.

19. The clock system of claim 13, wherein said first TOF system is disposed within a motor vehicle.

20. The clock system of claim 13, wherein said clock system is implemented on a CMOS IC containing at least part of said first TOF system.

* * * * *